United States Patent [19]

Staley

[11] 4,354,303

[45] Oct. 19, 1982

[54] METHOD OF DISC BRAKE REPAIR

[76] Inventor: Raymond J. Staley, 15990 S. Hampton, Livonia, Mich. 48150

[21] Appl. No.: 216,679

[22] Filed: Dec. 15, 1980

[51] Int. Cl.³ .............................................. B23P 7/02
[52] U.S. Cl. ............................. 29/402.08; 29/402.02; 29/402.06; 188/18 A
[58] Field of Search ........... 29/402.08, 402.02, 402.03, 29/402.04, 402.06, 402.09, 402.01, 402.07; 188/214, 73.46, 18 A

[56] References Cited

U.S. PATENT DOCUMENTS

| 3,305,040 | 2/1967 | Cadiou . | |
|---|---|---|---|
| 3,478,844 | 11/1969 | Beuchle . | |
| 3,654,689 | 4/1972 | Schwarz | 29/402.08 |
| 4,075,142 | 2/1978 | Morse et al. . | |

OTHER PUBLICATIONS

Kelsey Disc Brake Service Manual.

Primary Examiner—Carl E. Hall
Assistant Examiner—V. K. Rising
Attorney, Agent, or Firm—Harness, Dickey & Pierce

[57] ABSTRACT

A method of repairing disc brake calipers is disclosed which avoids the necessity and relatively high costs associated with replacement of the caliper housing. The method is particularly adapted for use in repairing calipers in which the piston carries a seal which sealingly engages and is movable along the cylinder sidewall and provides a procedure whereby the cylinder sidewall may be modified to accommodate a seal and the piston may be replaced with a non-seal carrying type piston thereby eliminating the need to provide a substantially perfect cylinder wall surface in order to create a reliable seal.

7 Claims, 4 Drawing Figures

U.S. Patent
Oct. 19, 1982
4,354,303
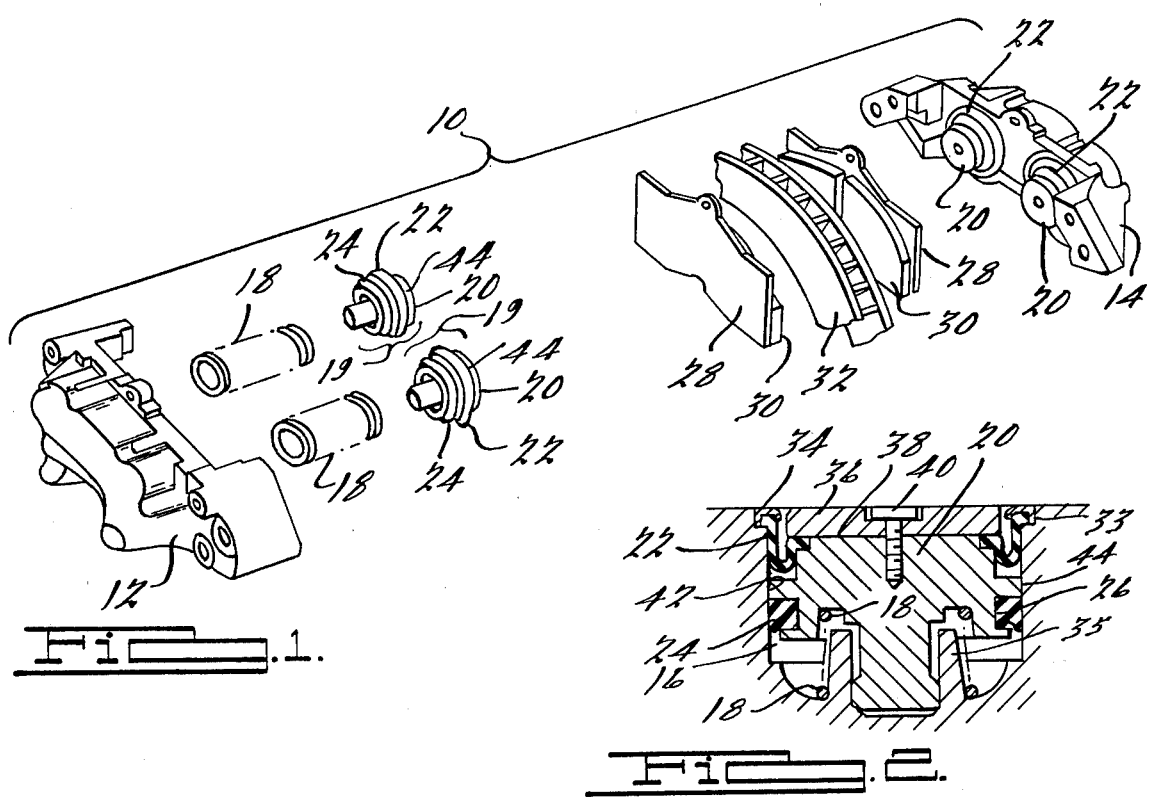
FIG. 1.
FIG. 2.
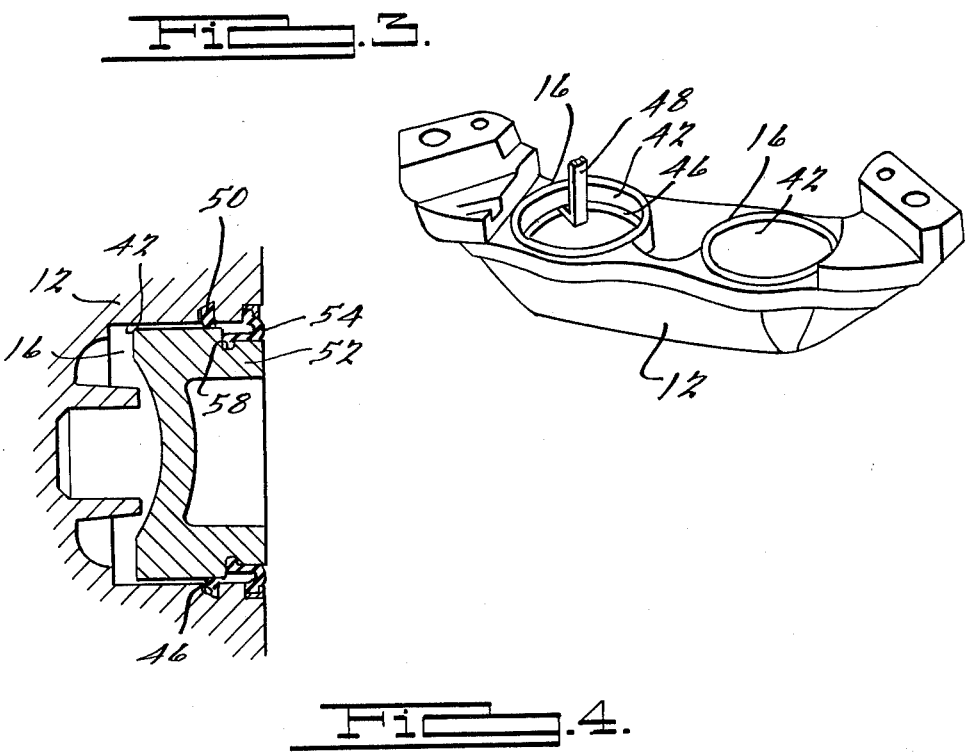
FIG. 3.
FIG. 4.

METHOD OF DISC BRAKE REPAIR

BACKGROUND AND SUMMARY OF THE INVENTION

The present invention relates generally to disc brake systems for motor vehicles and more particularly to a method of repairing disc brake calipers incorporated in such systems.

Disc brake systems typically comprise a master cylinder which operates to supply hydraulic or brake fluid under pressure to calipers mounted adjacent the vehicle wheels, in response to depression of the brake pedal by the vehicle operator. The caliper includes a housing having one or more pistons movably disposed within a cylinder provided therein, the piston or pistons being operative to move a pair of disc brake pads into engagement with opposite axially facing surfaces of a rotor which is secured so as to rotate with the vehicle wheel, so as to exert a braking force thereon. In some systems, a single piston is provided and the caliper housing is movable in an axial direction with respect to the rotational axis of the wheel so as to exert a braking force on opposite sides of the rotor. In other systems, the caliper may be fixedly secured to associated support structure and two or more pistons provided on opposite sides of the rotor which are designed to simultaneously advance the pads into engagement with the rotor.

In one form of caliper presently in use on a number of vehicles and with which the present invention is principally concerned, the piston has an annular groove provided thereon within which a seal is disposed which sealingly engages the sidewall of the cylinder so as to prevent fluid leakage therefrom. This seal must be located adjacent the inner edge of the piston in order to maintain a sealing relationship with the cylinder sidewall as the piston is moved outwardly therefrom both during actuation of the brakes and as the pads are worn down through use. Thus, when the pads are new and the piston is normally positioned substantially fully within the cylinder, a significant portion of the cylinder sidewall is located outwardly from the sealed brake fluid containing chamber.

While most disc brake calipers also include dust boots extending between the outer end of the piston and the outer edge of the caliper, they have not proven totally effective in preventing contaminants from contacting the exposed cylinder walls. Thus, when repairing disc brake systems utilizing seals mounted on the piston, it has frequently been found that the cylinder walls have become corroded and pitted to the extent that repair thereof cannot safely be effected. It may then become necessary to replace the entire caliper housing in order to return the brake system to a reliable operating condition. This replacement of the caliper housing in many cases represents a significant increase in the cost of the brake repair. This is particularly true in those systems using multiple piston type calipers as both inner and outer housings may need to be replaced. Further, as the automobile using this type of caliper becomes older, it may very well become impossible to obtain suitable replacement castings which will fit the particular vehicle without potentially extensive and possibly very costly modification to the mounting arrangement therefor.

Accordingly, the present invention provides a method of repairing such disc brake calipers which enables the existing caliper housing to be reused substantially without concern as to the degree of pitting of the cylinder walls while still providing an extremely reliable fully operational brake system. Because the repair method allows the existing caliper housing to be reused, the cost of repairing such system will be greatly reduced. The present method requires a machining operation be performed on the caliper housing to provide a seat in the cylinder sidewall for the piston seal. The piston is then replaced with a piston having a relatively smooth sidewall adapted to sealingly engage the seal provided in the cylinder sidewall. Because the seal no longer is movable along the sidewalls of the cylinder but rather is stationary being fitted within the machined seat, the presence of an imperfect cylinder sidewall as a result of such pitting will not affect the integrity of the seal thus created with the piston. Further, because the cost of replacement pistons is relatively small as compared to caliper housings, future repairs of the system may be accomplished at even lower costs thus affording substantial savings over the life of the vehicle. Additionally, because the new seal will be positioned adjacent the outer end of the cylinder, substantially the entire cylinder wall will be positioned within the sealed brake fluid containing chamber and thus fully protected from any further degradation due to contact with corrosive contaminants or the like. This repair method may be particularly advantageous to owners of older vehicles for which obtaining of replacement caliper housings may be extremely difficult or even totally impossible.

Additional advantages and features of the present invention will become apparent from the subsequent description and the appended claims taken in conjunction with the accompanying drawings.

BRIEF DESCRIPTION OF THE DRAWINGS

FIG. 1 is an exploded perspective view of a typical disc brake caliper assembly which is to be repaired in accordance with the method of the present invention;

FIG. 2 is a fragmentary cross-sectional view of a portion of a disc brake caliper showing a piston in assembled relationship with a caliper housing which is to be repaired in accordance with the method of the present invention;

FIG. 3 is a perspective view of a disc brake caliper housing showing a cutting tool machining an annular groove in the cylinder sidewall thereof, all in accordance with the present invention; and FIG. 4 is a fragmentary cross-sectional view showing a portion of the caliper of FIG. 1 in assembled condition after being repaired in accordance with the method of the present invention.

DESCRIPTION OF THE PREFERRED EMBODIMENTS

Referring now to the drawings and in particular to FIG. 1, there is shown a disc brake caliper assembly indicated generally at 10 which is to be repaired in accordance with the method of the present invention. Caliper assembly 10 is of the multiple piston type and includes a first outer disc brake caliper housing 12 and a second inner caliper housing 14. Caliper housings 12 and 14 each contain a pair of cylinders 16 within each of which a piston spring 18 and a piston assembly 19 is movably disposed.

Each of the piston assemblies 19 are substantially identical and comprise an elongated piston 20 of irregular shape generally as shown having an annular groove 26 provided adjacent the inner end thereof within which a suitable seal 24 is fitted. A dust boot 22 is also provided being fitted within another annular groove adjacent the outer end of piston 20. In the form of piston illustrated, an insulator member 36 is also provided being secured to the outwardly facing surface 38 of piston 20 by means of a suitable threaded fastener 40. Insulator 36 is of a size so as to overlie and partially define the groove into which dust boot 22 is fitted.

An annular groove 33 is provided at the outer end of cylinder 16 into which the outer circumferential edge of dust boot 22 is fitted and retained by means of a suitable press fit retaining ring.

As previously mentioned, piston spring 18 is also positioned within cylinder 16 and extends between a suitable seat provided on the inner end of piston 20 and the inner end wall of cylinder 16. A generally cylindrical hollow projection 35 is formed extending axially outwardly from the inner end wall of cylinder 16 the outer surface of which operates to maintain spring 18 in position while the inner surface operates to guide movement of piston 20.

As best seen with reference to FIG. 2, when piston assembly 19 is installed in operative relationship within cylinder 16, seal 24 provided on piston 20 will sealingly engage cylinder wall 42 thereby defining a sealed chamber into which hydraulic or brake fluid may be conducted under pressure so as to actuate pistons 20 in an outward direction which in turn will move the brake lining material forming a part of brake pads 28 into engagement with rotor 32 thereby exerting a clamping type braking force thereon. When the brake pads are relatively new, piston 20 will be positioned well within cylinder 16 approximately as shown in FIG. 2. As the lining material wears, however, the piston will move progressively outwardly. Thus, it is necessary that seal 24 provided on piston 20 be positioned adjacent the inner edge thereof. However, this positioning of seal 24 leaves a substantial portion of sidewall 42 of cylinder 16 extending outwardly therefrom which is thus protected from the elements solely by dust boot 22.

While dust boot 22 is intended to keep out most of the elements of weather, salt water, etc., it is not totally effective in this regard and thus some such corrosive contaminants invariably enter causing the portion of the cylinder sidewall above the piston seal 24 to become corroded and pitted. Further, it is possible that the cylinder wall 42 may also become scored by the action of piston 20 due to the presence of such corrosion. When this condition manifests the piston seal 24 may no longer create an efficient sealing contact with cylinder sidewall 42 thereby allowing leakage of brake fluid as well as reducing or even totally relieving actuating pressure required to actuate piston 20. In the past the only practical remedy has been to replace the entire offending caliper housing. This results in a very costly repair job particularly, as is often the case, when more than a single cylinder has suffered such damage. Further, in some cases it may be difficult to obtain replacement housings in which case the vehicle may be out of service for an extended period of time.

The present invention, however, provides a method of disc brake repair that eliminates the need to replace the caliper housing when such problems are encountered and thus enables a repair to be effected at a fraction of the cost to the vehicle owner heretofore required. In accordance with the method of the present invention, the caliper must first be removed from the vehicle in accordance with the normal procedure therefor. Typically, this requires that a substantial portion of the brake fluid should be removed from the master cylinder reservoir which serves the disc brakes. The vehicle should then be raised evenly on a hoist or jackstands and the wheels corresponding to the disc brakes requiring repair, removed. After disconnecting the brake fluid supply tubes and plugging them to prevent loss of fluid and removing the caliper assembly from the vehicle, first and second caliper housings 12 and 14 must then be separated to provide access to pistons 20. To remove pistons 20, piston dust boots 22 must be freed by pushing piston 20 down into its caliper cylinder 16 as far as it will go. A screwdriver blade can then be inserted under the inner edge of the dust boot retaining ring 34. Using the piston as a fulcrum, the dust boot retaining ring 34 and piston boot 22 can be pryed from their seat in the caliper housing 12 or 14. (Hereinafter, just caliper housing 12 will be referred to. But the same procedure applies equally to both.) The piston assemblies 19 and piston springs 18 can then be removed from caliper housing 12.

The cylinder 16 should then be carefully cleaned and inspected to determine the presence of any pitting or scoring of the sidewall 42. Assuming that the sidewall of at least one of the cylinders is sufficiently damaged so as to render it unacceptable for use in its present condition, caliper housing 12 will then be placed in an appropriate vise or other suitable holding device whereby an annular groove 46 can be machined in the cylinder sidewall 42 by means of a cutting tool 48 as shown in FIG. 3. As depicted in FIG. 4, groove 46 is machined so that it is shallower toward the bottom of the cylinder bore. It is important in order to assure sufficient movement of a replacement piston that groove 46 be machined in sidewall 42 closely adjacent the outer edge of cylinder 16. This groove 46 may be machined in sidewall 42 in any suitable manner such as by use of a suitable boring machine or even by use of a conventional lathe fitted with an appropriate cutting tool.

After groove 46 is machined in cylinder sidewall 42, the caliper housing must be thoroughly cleaned and all passages carefully blown out to insure complete removal of all metal particles therefrom which could interfere with satisfactory operation of the caliper. Thereafter, the caliper may be reassembled by first installing a new piston seal 50 in groove 46 and thereafter inserting a new piston 52 into cylinder 16. New piston 52 is a conventional disc brake piston manufactured for use in disc brake systems in which the piston seal is originally positioned within a groove provided in the cylinder sidewall and has substantially smooth sidewalls 53 which are operative to slidingly engage and effect an appropriate seal with the piston seal 50. Preferably piston seal 50 will have a generally square cross-sectional shape as previously mentioned and because the inner edge of groove 46 is shallower than the outer edge, the inner edge of seal 50 will be more tightly compressed so as to form a tight fluid sealing engagement with piston 52. In this respect, piston seal 50 remains stationary as new piston 52 is actuated to travel within cylinder 16. This is in direct opposition to the original assembly of the disc brake in which the piston seal 24 was carried by a groove 26 in the piston wall 44 and therefore traveled with piston 20 within cylinder 16 as the brakes were operated.

New piston seal 50 is designed to provide automatic adjustment of clearance between the disc or rotor 32 and the friction pad 30 and friction pad backing plate 28 following each brake application in a manner substantially the same as in calipers which are originally manufactured with piston seals in the sidewalls of the cylinder. As shown in FIG. 4, when the brakes are applied, new piston seal 50 is deflected outwardly both by the hydraulic pressure and the outward movement of piston 52. When hydraulic pressure is released, the piston seal 50 relaxes to its original generally rectangular cross-sectional shape, causing piston 52 to be retracted into the cylinder 16 a slight amount sufficient to provide proper running clearance between the rotor and brake pads. As friction pads 30 wear, the travel of piston 52 tends to exceed the limit of deflection of the piston seal 50. Piston 52 therefore slides with respect to piston seal 50 to the precise extent necessary to compensate for wear of friction pad 30. It should also be noted that new piston 52 is appropriately sized to avoid interference when fully retracted with the projections 35 of caliper housing 12 that formerly centered piston springs 18.

As illustrated in FIG. 4, the top of piston 52 is manufactured to accept a new piston dust boot 54. The outside diameter of new piston dust boot 54 is pressed into indentation 33 in caliper housing 12 and secured by dust boot retaining ring 34. The inside diameter of new piston dust boot 54 fits into a recess or annular groove 58 provided adjacent the outer end of piston 52.

In reassembling the caliper housing assembly, new piston seal 50 can be installed into groove 46 of cylinder sidewall 42 without the use of special tools, however great care must be taken not to damage the seal lip as the edge of new piston 52 is passed by it. After the inside diameter of the new piston dust boot 54 is fit into the recess 58 in new piston 52, new piston 52 is carefully inserted into cylinder 16. The outside diameter of new piston dust boot 54 is then carefully seated in indentation 33 in caliper housing 12.

After the aforementioned steps are completed with each cylinder 16 of each caliper housing of each disc brake assembly requiring repair, first and second caliper housings 12 and 14 can be reassembled and reinstalled on the motor vehicle.

The above description specifically relates to a method of disc brake repair that is relatively simple and substantially less expensive than the methods of repair previously known. The savings involved is multiplied both by the number of caliper housings per disc brake assembly and the number of disc brake assemblies per vehicle. As can readily be seen, on some vehicles with disc brake assemblies on all wheels, and two caliper housings per disc brake assembly, the economics of this invention become substantial.

While the method of the present invention has been illustrated and described with reference to a particular style of multiple piston disc brake caliper, it is equally applicable for use in converting substantially any form of disc brake caliper from the type in which a piston seal is located on the piston itself and hence necessitates a substantially smooth unpitted cylinder wall to effect an adequate sealing relationship to the type in which the seal is positioned on the cylinder wall itself. It should be noted that further corrosion of the cylinder wall will be substantially eliminated after the repairs of the present method have been effected because substantially the entire cylinder wall will always be located within the sealed brake fluid containing chamber. However, because increasing portions of the piston will extend outwardly from seal 50 as the brake pads wear, it is possible the sidewall portions thereof may become corroded. However, such pistons are relatively simple in construction and thus may be easily replaced in connection with subsequent brake repairs at a relatively low cost. It should also be noted that should only one or two cylinders of a particular caliper require the repair of the present method, it may be preferable to effect the same repair to all cylinders of that caliper in order to further assure more even braking pressure is exerted across substantially the entire surface area of the brake pad. Further, it may be desirable to also effect the same repair to the caliper associated with the corresponding wheel on the opposite side of the vehicle for the same reasons.

In any event, it is apparent that the method of the present invention offers a means whereby caliper housings which otherwise would require replacement may be modified so as to still provide a safe, efficient fully reliable brake system at substantially less cost to the vehicle owner and may aid in allowing the vehicle to be returned to service much more rapidly than otherwise possible.

While it will be apparent that the preferred embodiments of the invention disclosed are well calculated to provide the advantages and features above stated, it will be appreciated that the invention is susceptible to modification, variation and change without departing from the proper scope or fair meaning of the subjoined claims.

I claim:

1. A method of repairing of disc brake systems having a disc brake caliper housing, said caliper housing comprising a cylinder, and a piston assembly movably disposed within said caliper housing, said piston assembly comprising a piston, a piston dust boot, and a piston seal, said seal being positioned on and movable with said piston, said method comprising: removing said piston assembly from said cylinder; machining an annular groove in a sidewall of said cylinder; installing a new piston seal in said annular groove; installing a generally cylindrically shaped replacement piston in said cylinder.

2. A method of repairing disc brake assemblies as set forth in claim 1 wherein said replacement piston is configured to operate in disc brake assemblies in which said new piston seal is carried by a groove in said cylinder sidewall.

3. A method of repairing disc brake assemblies as set forth in claim 1 wherein said annular groove is machined so that it is shallower toward the bottom of said cylinder.

4. A method of repairing disc brake assemblies as set forth in claim 1 wherein said method further comprises fitting one edge of a replacement dust boot to said piston and fitting the other edge into a groove provided on said caliper housing.

5. A method of repairing disc brake assemblies as set forth in claim 4 wherein said replacement piston bears against said friction pad backing plate to apply said friction pad to said disc when said disc brake assembly is actuated.

6. A method of repair for disc brake assemblies having a disc brake cylinder provided in a disc brake caliper housing, said cylinder having a sidewall, a pressure actuated piston within said cylinder, said piston carrying a piston seal within a first annular groove in said piston sidewall, said seal bearing against said sidewall of said cylinder to prevent brake fluid from leaking out from between said cylinder sidewall and said corresponding piston, and a piston dust boot carried by said piston, said method comprising the steps of:

dismantling said disc brake assembly to remove said disc brake caliper housing;

removing said piston, said piston seal, and said piston dust boot from said cylinder;

machining an annular groove in said sidewall of said cylinder, said annular groove being configured shallower toward the bottom of said cylinder;

installing a new annular piston seal into the machined annular groove, said new piston seal having a generally rectangular cross-sectional shape;

fitting a new piston dust boot onto a replacement piston, said replacement piston being configured to operate in a disc brake assemby in which a piston seal remains stationary within a groove in a cylinder sidewall and said replacement piston has a smooth wall that slidably bears against said piston seal in a sealing manner when said disc brake assembly is actuated;

installing said replacement piston and said new piston dust boot into said cylinder;

fastening said new piston dust boot to said disc brake caliper housing; and reinstalling said disc brake caliper housings in said disc brake assembly.

7. A method for repairing disc brake assemblies as set forth in claim 6 wherein said method further comprises fitting one edge of a replacement dust boot to said piston and fitting the other edge into a groove provided on said caliper housing.

* * * * *